(12) United States Patent
Black et al.

(10) Patent No.: US 8,887,214 B1
(45) Date of Patent: Nov. 11, 2014

(54) SYSTEM AND METHOD FOR UNIFIED METADATA BROKERING AND POLICY-BASED CONTENT RESOLUTION IN A VIDEO ARCHITECTURE

(75) Inventors: Neil Black, Toronto (CA); Matt Collum, Toronto (CA); Alexander Katsnelson, Toronto (CA); Shane Ruman, Toronto (CA); Malcolm B. Ferguson, Toronto (CA); Gil C. Cruz, Hampton, NJ (US); Mahesh C. Vittal Viveganandhan, Cupertino, CA (US); Flemming S. Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/543,775

(22) Filed: Jul. 6, 2012

Related U.S. Application Data

(60) Provisional application No. 61/505,358, filed on Jul. 7, 2011.

(51) Int. Cl.
 *G06F 3/00* (2006.01)
 *G06F 13/00* (2006.01)
 *H04N 5/445* (2011.01)
 *H04N 7/173* (2011.01)

(52) U.S. Cl.
 USPC .................. 725/90; 725/37; 725/60; 725/61; 725/86; 725/87; 725/91; 725/105; 725/112

(58) Field of Classification Search
 None
 See application file for complete search history.

(56) References Cited

U.S. PATENT DOCUMENTS

| 7,650,505 B1 | 1/2010 | Masurkar |
| 8,327,019 B2 | 12/2012 | Gould et al. |
| 8,468,271 B1 | 6/2013 | Panwar et al. |
| 2005/0177750 A1 | 8/2005 | Gasparini et al. |
| 2006/0130069 A1 | 6/2006 | Srinivasan et al. |
| 2007/0080823 A1 | 4/2007 | Fu et al. |
| 2007/0107019 A1 | 5/2007 | Romano et al. |
| 2008/0065775 A1 | 3/2008 | Polk |
| 2008/0192770 A1 | 8/2008 | Burrows et al. |

(Continued)

FOREIGN PATENT DOCUMENTS

| WO | WO 2013/006839 | 1/2013 |
| WO | WO 2013/006844 | 1/2013 |

OTHER PUBLICATIONS

U.S. Appl. No. 13/543,754 entitled System and Method for Cross-Screen Experiences and Companion Device Services in a Video Architecture filed Jul. 6, 2012, Inventor(s): Flemming S. Andreasen,et al.

(Continued)

*Primary Examiner* — Justin Shepard
(74) *Attorney, Agent, or Firm* — Patent Capital Group

(57) ABSTRACT

A method is provided in one example embodiment and includes establishing a connection between a client and a messaging fabric associated with a video system that includes a metadata broker element; storing metadata information associated with content, where the content is associated with a release uniform resource locator (URL); and generating a content guide, (e.g., an electronic program guide) that includes a plurality of content definitions (e.g., channels). A particular content (e.g., program) in the content guide is associated with a particular release URL that can be translated into a more specific URL based on a number of criteria.

20 Claims, 9 Drawing Sheets

(56) References Cited

U.S. PATENT DOCUMENTS

| | | |
|---|---|---|
| 2008/0275982 A1 | 11/2008 | Busch et al. |
| 2008/0292074 A1 | 11/2008 | Boni et al. |
| 2009/0067441 A1 | 3/2009 | Ansari et al. |
| 2009/0168787 A1 | 7/2009 | Ansari et al. |
| 2009/0241104 A1 | 9/2009 | Amiga et al. |
| 2010/0005171 A1 | 1/2010 | Arolovitch |
| 2010/0158476 A1 | 6/2010 | Hao et al. |
| 2010/0162294 A1 | 6/2010 | Yin et al. |
| 2010/0211678 A1 | 8/2010 | McDysan et al. |
| 2010/0231790 A1 | 9/2010 | Ansari et al. |
| 2011/0030018 A1* | 2/2011 | Mizuno et al. ............ 725/88 |
| 2011/0113122 A1 | 5/2011 | Drope |
| 2011/0126296 A1* | 5/2011 | Moore ............ 726/28 |
| 2011/0252082 A1* | 10/2011 | Cobb et al. ............ 709/203 |
| 2011/0307623 A1 | 12/2011 | George et al. |
| 2011/0320575 A1 | 12/2011 | Pope et al. |
| 2011/0320585 A1 | 12/2011 | Pope et al. |
| 2011/0321062 A1 | 12/2011 | Pope et al. |
| 2012/0174157 A1 | 7/2012 | Stinson et al. |
| 2012/0209926 A1 | 8/2012 | Backholm et al. |
| 2012/0304233 A1 | 11/2012 | Roberts et al. |
| 2012/0311038 A1 | 12/2012 | Trinh et al. |
| 2013/0007813 A1 | 1/2013 | Baskaran et al. |
| 2013/0013688 A1 | 1/2013 | Wang et al. |
| 2013/0013698 A1 | 1/2013 | Relyea et al. |
| 2013/0013704 A1 | 1/2013 | Pope et al. |

OTHER PUBLICATIONS

U.S. Appl. No. 13/543,780 entitled System and Method for Content Access Protection and Session Tracking With Adaptive Bitrate filed Jul. 6, 2012, Inventor(s): David Stuart Morgan,et al.

U.S. Appl. No. 13/543,769 entitled System and Method for Topic-Based Eventing for Flexible System Management filed Jul. 6, 2012, Inventor(s): Nick George Pope,et al.

PCT Oct. 10, 2012 International Search Report and Written Opinion from International Application PCT/US2012/045858; 10 pages.

PCT Oct. 24, 2010 International Search Report and Written Opinion from International Application PCT/US2012/045851; 10 pages.

Lubke, Robert, et al., "MobilisGroups: Location-based group formation in Mobile Social Networks," Pervasive Computing and Communications Workshops (PERCOM Workshops), 2011 IEEE International Conference on, IEEE, Mar. 21, 2011.

Schuster, Daniel, et al., "Service-based development of mobile real-time collaboration aplications for Social Networks," Pervasive Computing and Communications Workshops (PERCOM Workshops(, 2010 8th IEEE International Conference on, IEEE, Piscataway, NJ, USA, Mar. 29, 2010; 6 pages.

D. Harrington, et al., "An Architecture for Describing Simple Network Management Protocol (SNMP) Management Frameworks," Network Working Group, RFC 3411, Dec. 2002, 64 pages; http://www.ietf.org/rfc/rfc3411.txt.pdf.

R. Gerhards, "The Syslog Protocol," Network Working Group, RFC 5424, Mar. 2009, 38 pages; http://www.ietf.org/rfc/rfc5424.txt.pdf.

Barth, "HTTP State Management Mechanism," Internet Engineering Task Force (IETF), RFC 6265, Apr. 2011, 37 pages; http://www.ietf.org/rfc/rfc6265.txt.pdf.

U.S. Appl. No. 14/166,202 entitled System and Method for Cross-Screen Experiences and Companion Device Services in a Video Architecture filed Jan. 28, 2014, Inventor(s): Flemming S. Andreasen,et al.

USPTO Mar. 6, 2014 Non-Final Office Action from U.S. Appl. No. 13/543,620.

USPTO Mar. 7, 2014 Non-Final Office Action from U.S. Appl. No. 13/543,692.

USPTO Nov. 10, 2013 Notice of Allowance from U.S. Appl. No. 13/543,754.

"XMPP PubSub," White Paper, Isode, Jul. 13, 2011, 6 pages http://www.isode.com/whitepapers/xmpp-pubsub.html.

Brand, Richard, et al., "IPTV Content on Demand Service Architecture," an ATIS Webinar, Apr. 21, 2011, 26 pages.

Millard, Peter, et al., "XEP-0060: Publish-Subscribe," Jul. 12, 2010, © 1999-2012 XMPP Standards Foundation, 240 pages http://xmpp.org/extensions/xep-0060.html.

Nawrocki, Mike, "ATIS IPTV Standards Development via ATIS' IPTV Interoperability Forum (IIF)," GSC-16 Halifax Canada 2011, 67 pages.

Thompson, B., et al., "ATIS Internet Sourced Content Initiative and Relevance to CDNI," Network Working Group Internet Draft draft-thompson-cdni-atus-scenarios-00, Mar. 29, 2011, 16 pages.

PCT Jan. 7, 2014 International Preliminary Report on Patentability from International Application PCT/US2012/045858; 6 pages.

PCT Jan. 7, International Preliminary Report on Patentability from International Application PCT/US2012/045851; 7 pages.

USPTO May 1, 2014 Non-Final Office Action from U.S. Appl. No. 13/543,780.

USPTO Nov. 8, 2014 Final Office Action from U.S. Appl. No. 13/543,620.

USPTO Nov. 8, 2014 Final Office Action from U.S. Appl. No. 13/543,692.

* cited by examiner

SYSTEM AND METHOD FOR UNIFIED METADATA BROKERING AND POLICY-BASED CONTENT RESOLUTION IN A VIDEO ARCHITECTURE

CROSS-REFERENCE TO RELATED APPLICATION

This application claims the benefit of priority under 35 U.S.C. §119(e) to U.S. Provisional Application Ser. No. 61/505,358, entitled "VIDEOSCAPE SYSTEM PLATFORM" filed Jul. 7, 2011, which is hereby incorporated by reference in its entirety.

TECHNICAL FIELD

This disclosure relates in general to the field of communications and, more particularly, to a system and a method for unified metadata brokering and policy-based content resolution in a video architecture.

BACKGROUND

Service providers face difficult challenges in the context of providing video services for a diverse group of end-users. Many service providers are gearing up to implement their 'TV Everywhere' initiatives, which can offer a level of freedom being demanded by consumers today. One aspect of this demand includes the ability to access content from any device at any time and from any location. Providing an effective integration of various technologies, while accounting for specific device options, specific location possibilities, specific user preferences, specific content and programming, etc. is a significant challenge for service providers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a connection (e.g., wired, wireless, etc.) between a client and a messaging fabric associated with a video system that includes a metadata broker element; storing metadata information associated with content, where the content is associated with a release uniform resource locator (URL); and generating a content guide (e.g., an electronic program guide), which can include any suitable interface, application, display, listing, grid, or tool to be used in managing data. The content guide can include includes a plurality of asset (e.g., channel) definitions. In this context, the asset can include any suitable channel, station, video program, or content. A particular asset in the content guide can be associated with a particular release URL.

In more specific embodiments, entries in the content guide are correlated by metadata fields. Additionally, the content can be associated with (for example) linear television programs; on-demand videos; time-shifted programs; and advertising. The method can also include storing particular metadata information associated with a user's personalized content in the metadata broker element, where the personalized content is associated with a particular release URL.

In addition, more specific methods can include associating a plurality of users with a user group that is identified using particular metadata. Also, the method could include receiving a metadata search query for content at the metadata broker element; and providing a particular release URL that matches the search query. In more detailed implementations, the method can include receiving a request to view a particular piece of content by the client invoking a particular release URL; authenticating the client requesting the particular piece of content; and providing the particular piece of content to the client. Providing the particular piece of content to the client may include translating a request to a particular version of the particular piece of content. Any suitable resolution characteristics and delivery mechanisms can be determined for the particular piece of content (e.g., based on a device being used by the client).

Example Embodiments

Figure 1:
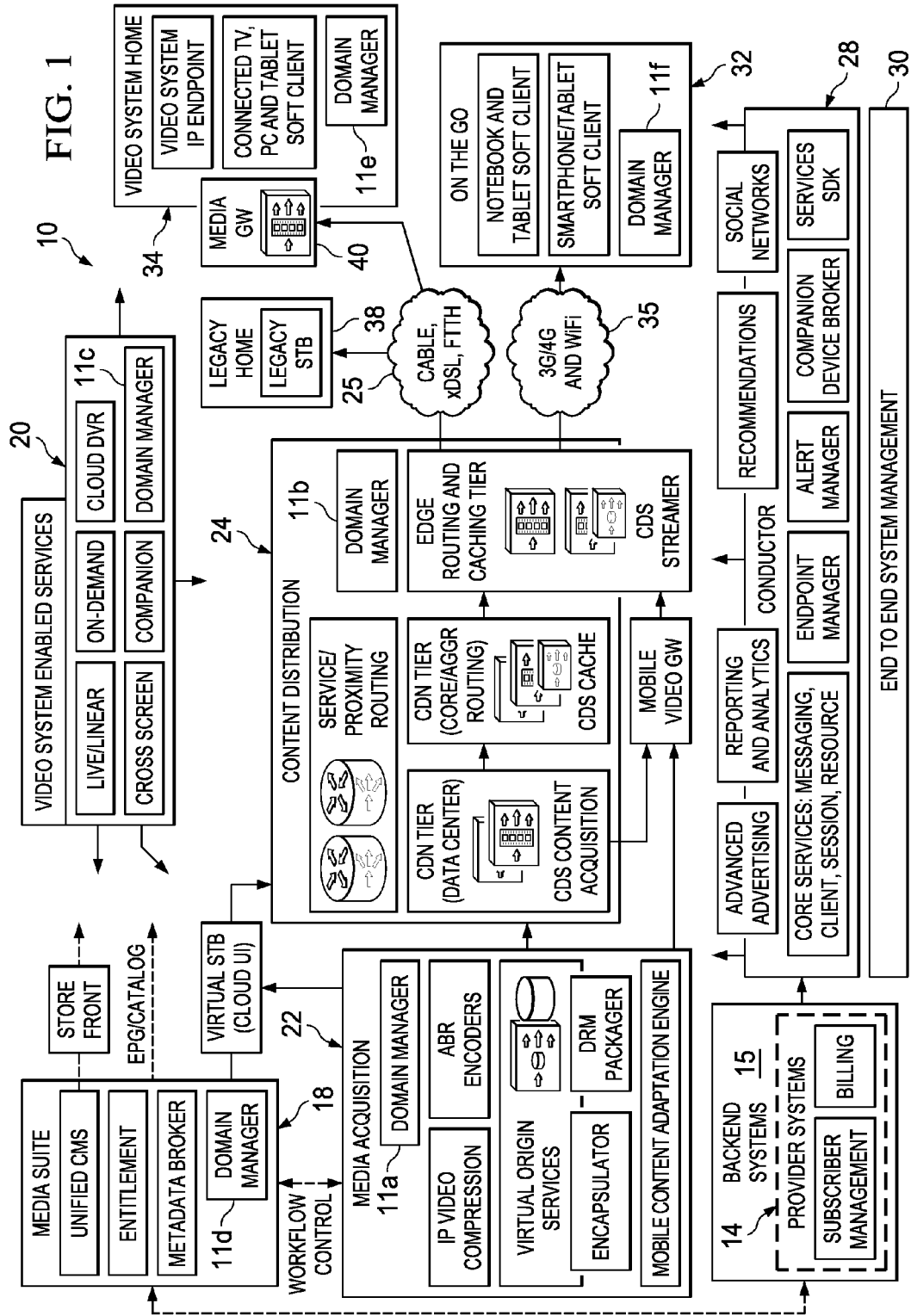
FIG. 1 is a simplified block diagram of a video system for providing a video platform in accordance with one embodiment of the present disclosure.

Turning to FIG. 1, FIG. 1 is a simplified block diagram of a video system 10 configured for providing an integrated video platform in accordance with one embodiment of the present disclosure. Video system 10 may include a plurality of backend systems 15, which may further include a number of provider systems 14 that are inclusive of subscriber management and billing. In addition, video system 10 may include a media suite 18 for content and metadata management, which may be coupled to a media acquisition 22 for content processing. A video system enabled services element 20 may be suitably linked to media suite 18, media acquisition 22, and a content distribution 24.

Additionally, any number of networks may suitably couple content distribution 24 to a video system home 34, as well as an "on the go" component 32, which may be associated with wireless activities, roaming, WiFi, end-user devices more generally, etc. In one particular example being illustrated in FIG. 1, a 3G/4G and WiFi network 35, along with a cable, xDSL, FTTH network 25 are being used to facilitate the activities of the video platform. FIG. 1 also includes a conductor 28 video control plane, which can be suitably coupled to media acquisition 22, content distribution 24, and an end to end system management 30. Note that the larger blocks of FIG. 1 (e.g., conductor 28, content distribution 24, media suite 18, video system enabled services 20, vide system home 34, media acquisition, 22, etc.) can be viewed as logical suites that can perform certain activities of the present disclosure. Note that their functions, responsibilities, tasks, capabilities, etc. can be distributed in any suitable manner, which may be based on particular video needs, subscription models, service provider arrangements, etc.

In accordance with the teachings of the present disclosure, video system 10 is configured to offer service providers a number of valuable features. For example, video system 10 is configured to extend video services to a variety of devices ranging from smartphones, tablets, iPads, personal computers (PCs), to set-top boxes (e.g., n-screen), cable systems, etc. Additionally, this platform of video system 10 is configured to extend video services to any IP access network (un-tethering). The architecture can also provide unified content management between different devices, different networks, and different video services. Additionally, the architecture can provide a flexible platform and infrastructure that enables existing services to be modified (and for new services to be developed by the service provider) by leveraging a combination of Internet protocol (IP), hypertext transfer protocol (HTTP)/web-services, Extensible Messaging and Presence Protocol (XMPP) and a workflow-enabled infrastructure with open interfaces and both client and server software development kits (SDKs). An initial set of applications can also be provided (e.g., linear, time-shift, on-demand, etc.).

Additionally, the architecture can use adaptive bitrate (ABR) to facilitate video service delivery (independent of the access). This allows a video offering that can be targeted at consumers, which can offer "Anywhere, Any Access" that may be tied to subscription models. In addition, video system 10 can readily support unicast and multicast delivery with in-home cache optimizations for more efficient use of access network resources. This can include support for content protection, thereby enabling delivery of all content (not merely a subset of content). This also includes support for existing critical features such as Emergency Alert Service, Blackouts, Geo-Blocking, etc. Support is also provided for advertising (including dynamic ad support) and for legacy devices (primarily existing endpoint devices (e.g., set-top boxes (STBs)) for a smooth migration of existing infrastructure.

The architecture can also support hybrid optimizations for access providers to implement (e.g., in order to enhance their offering). In this context, hybrid is referring to the combination of traditional service provider video delivery technologies (e.g., MPEG transport stream over quadrature amplitude modulation (QAM) in a cable hybrid fiber-coaxial (HFC) environment) with pure IP video delivery technologies (e.g., HTTP-based adaptive bitrate).

In operation, communication system 10 can support the following end-user oriented use cases: 1) content discovery; 2) linear services for managed IP STBs and unmanaged devices (where migration for existing linear services is supported equally); 3) on-demand services for managed IP STBs and unmanaged devices (where migration for existing on-demand services is supported); 4) time-shifted TV services (e.g., in the form of Cloud DVR/time-shifted TV across screens for managed IP STBs and unmanaged devices (where migration for existing DVR services is supported); 5) cross-screen experience in the form of companion devices, where a companion device (e.g., iPhone) can be used as a remote control for another video system device (e.g., IP STB), or the companion device can enhance the viewing experience through value add/context or programming aware metadata information (e.g., Facebook/twitter feeds, additional program detail, hyperlinks, etc.); 6) screen-shifting, where the user is able to change playback to another device (e.g., from iPad to TV), pause and resume programs across devices, or have multi-room DVRs; 7) dynamic advertising; and 8) value add applications, which enable service providers to offer value add user experiences (e.g., such as Facebook connect capabilities, access to Olympics Applications, etc.).

Note that video services have traditionally been provided in a siloed fashion. Linear TV services were provided by Cable, Telco, or Satellite companies over legacy non-IP based infrastructures with service offerings that expanded to include time-shift, on-demand, and DVR type services. Services were offered to managed devices (e.g., a STB) on managed networks only (e.g., QAM-based cable). As IP infrastructure with relatively high bandwidth became more prevalent, a second wave of IPTV-based video systems appeared. A common theme in these systems is an IP multicast-based linear service, real-time streaming protocol (RTSP)-based on-demand (etc.) service, and a session initiation protocol (SIP)/IP multimedia subsystem (IMS) plus RSTP control plane, and/or an HTTP/web services plus RTSP based control plane coupled with metadata management (e.g., electronic program guide (EPG)) towards the end-users typically based on HTTP/web services. IPTV content delivery was generally assumed to be a fixed bitrate over managed networks (either supporting resource reservations to satisfy certain levels of service or simply having plentiful bandwidth).

A new 3rd wave of systems is now being considered with a design principle of any content to any device anywhere at any time. HTTP adaptive bitrate enables this model in the content delivery domain; however, for a service provider to provide premium video services, a control plane infrastructure is still needed. The existing IPTV based control plane architecture and solutions fall short in a number of areas needed to support the above 3rd wave systems in today's web-based environment, including: 1) a lack of consideration and service for HTTP ABR based content delivery, which does not have the notion of a "network" or cloud session (e.g., for troubleshooting, diagnostics, statistics, policy enforcement (upper limit on sessions)), etc.; and 2) the HTTP Simple Object Access Protocol/REpresentational State Transfer (REST)(SOAP/REST) based video control plane architectures fall short in several areas. This includes an inability to work through NATs (e.g., to support notification type services to clients (emergency alerts, operator initiated messaging/diagnostics, etc.)). This also includes bidirectional communication support and a way for cloud-initiated communication to target households, users, and/or specific devices are missing (e.g., eventing), and authentication/authorization considerations around such cloud-initiated communication is missing as well. In addition, such models work as request-response protocols in the client-server computing model, and they are generally not session-stateful, which is needed for some premium video services. These HTTP-based services do not retain information or status of each user for the duration of multiple requests. Therefore, when HTTP-based web services are deployed over a large cluster, it is difficult to track the user's progress from one request to another, unless a centralized database is used to track it.

The SIP/IMS-based video control planes provide persistent connections with bidirectional support and notification services, which solve several of the shortcomings of the HTTP-based control planes. However, the SIP/IMS based architectures fall short in several other areas as well (e.g., they are defined only for SIP/IMS-based services to be invoked and advertised). In today's world, ease of integration with HTTP and XML-based services is important. Additionally, SIP/IMS is based on a call setup model, whereby services are invoked as part of an incoming or outgoing session setup. Events within or outside of a session are supported as well. As a result of this, IMS service creation, composition, and interaction relies on the notion of IMS filter criteria, which are (statically defined) trigger points used to determine which of several IMS application servers (AS) to invoke.

Interaction between multiple application servers is handled by the (under-specified) Service Capability Interaction manager (SCIM) function. It is in many ways a more modern version of the classic Intelligent Network (IN) model used for telephony systems in the past. In the 3rd wave video system and today's increasingly web-based technology world, users and services both need to be considered as first-class citizens that are equally capable of initiating service to each other. Furthermore, an open framework of orchestrating such services is important, including responses to events in the system.

With SIP/IMS being designed around the need to establish a communication session (e.g., a call), it is not well suited to exchange structured data as part of a session by itself. For example, support for large messages is an issue over user datagram protocol (UDP), and SIP proxies are in general not intended to have frequent or substantial amounts of data sent through them. However, several video control plane services need that capability (e.g., remote scheduling, companion device experiences, interactive diagnostics, etc.).

Certain embodiments of video system 10 can offer an overall video services control plane architecture that addresses the above shortcomings. In accordance with one example implementation of the present disclosure, video system 10 can resolve the aforementioned issues (and potentially others) to provide a combination of cloud, network, and client capabilities that enables the service provider to offer its subscribers any content over any network to any device. The present disclosure provides the first complete instantiation of an end-to-end video platform solution supporting the full complement of managed video service offerings.

Within the platform of FIG. 1, the functional components are logically grouped into different suites. Extending beyond the core platform are components that are assumed to be preexisting, within either the service provider or the content provider networks. Specifically, service provider Business Support Systems/Operations Support Systems (SP BSS/OSS) represents a set of preexisting business and operations support systems. 3rd party web services are cloud-based services that the solution leverages, but are preexisting and can be leveraged in-place. Content provider control systems are preexisting or future systems that support the delivery of content into secondary distribution channels. A collection of different networks (both service provider managed networks and other networks) can also be provided that play a role in the delivery of the video service. Finally, the architecture can also include existing on-demand and linear content sources, representing both the origination of that content from the content provider/broadcaster, as well as the acquisition of that content within the service provider's network. The solid and dashed lines in this area represent the distinction between content metadata and content essence (the actual media files, etc.).

The cloud paradigm can extend the media and acquisition suites with enhanced capabilities for linear and time-shifted TV. The communication platform also introduces conductor and conductor services, providing an extensible service creation environment, common service capabilities, as well as massively scalable and persistent client connection technologies. Three additional suites are also provided, which includes the ad suite (represented as 'Advanced Advertising' in FIG. 1) that provides a core set of advanced advertising capabilities that integrates a web ad decision server capabilities. In addition, an application suite (e.g., Video System Enabled Services) is provided that builds on the base soft client capability provided in QuickStart. It also provides a base set of core and value-add end-user applications across both managed and unmanaged devices. A management suite (e.g., end to end system management) is also provided for client and endpoint management; it facilitates management of the overall video platform suite of products.

Video system 10 also builds on the distribution suite capabilities for the efficient delivery of both on-demand and linear content to client devices. The content delivery network (CDN) capability can be responsible for taking content that originates from the Content management/media processing functions, and delivering it to clients at scale, efficiently, and with minimal end-to-end latency. The CDN can provide a high degree of deployment flexibility: scaling from more centralized deployments to highly-distributed deployments using centralized root caching tiers, multiple intermediate caching tiers, and edge-caching tiers close to the client devices. CDN also provides intelligent content routing capabilities that are tied, through network proximity, to the real-time routing details of the underlying network elements. This enables the service provider to efficiently deliver content from the best edge cache resource, even during periods of network impairment.

The architecture also covers soft clients as well as managed devices. Specifically, the architecture includes a video system home gateway, as well as a video system IP STB. The home gateway, as an extension of the network, provides valuable linkage between managed and unmanaged devices within the home and the service provider cloud and network infrastructures. The IP STB, as well as all soft clients running on unmanaged devices, is designed to work across managed and unmanaged network environments. Soft client capabilities can be extended to include linear and time-shift capabilities, as well as leverage the evolving set of cloud and network APIs exposed by the various suites to provide a high-quality end-to-end user experience.

Video system 10 presents a migration to an all-IP based video and services infrastructure spanning the full service/content life cycle, from the video content and metadata acquisition, to content and metadata preparation, distribution, and delivery to the end-user. The video system encompasses a set of diverse products/suites with heterogeneous interfaces and implementations for these functions. The overall system follows a Service Oriented Architecture (SOA) development framework and, hence, supports multiple individual services, which are used via service orchestration and workflow engines. Each of the suites provides a set of well-defined services and associated interfaces, and it is with these services that end-user services are eventually provided. End-user services can be defined as including one or more services that users interact with to provide a user visible service. For example, a linear TV service provides features and logic to enable users to watch a particular channel in accordance with their subscription. The linear TV service does so by use of a number of underlying video system services and suites. Application suite services play a particular role in terms of providing application logic for one or more services. Users could be machines as well (e.g., for machine-to-machine oriented type services).

In certain implementations of the present disclosure, video system 10 can leverage a set of HTTP-based RESTful web services to support basic on-demand TV everywhere capabilities. These HTTP services, exposed to end-points by both the media suite and the distribution suite, can provide proven scalability, resiliency, and extensibility. In operation, the video platform can use a mix of HTTP RESTful web services and XMPP-based services, providing a powerful combination to support the enhanced capabilities for linear, time-shift TV, VOD, companion, and value-add applications.

Figure 2:
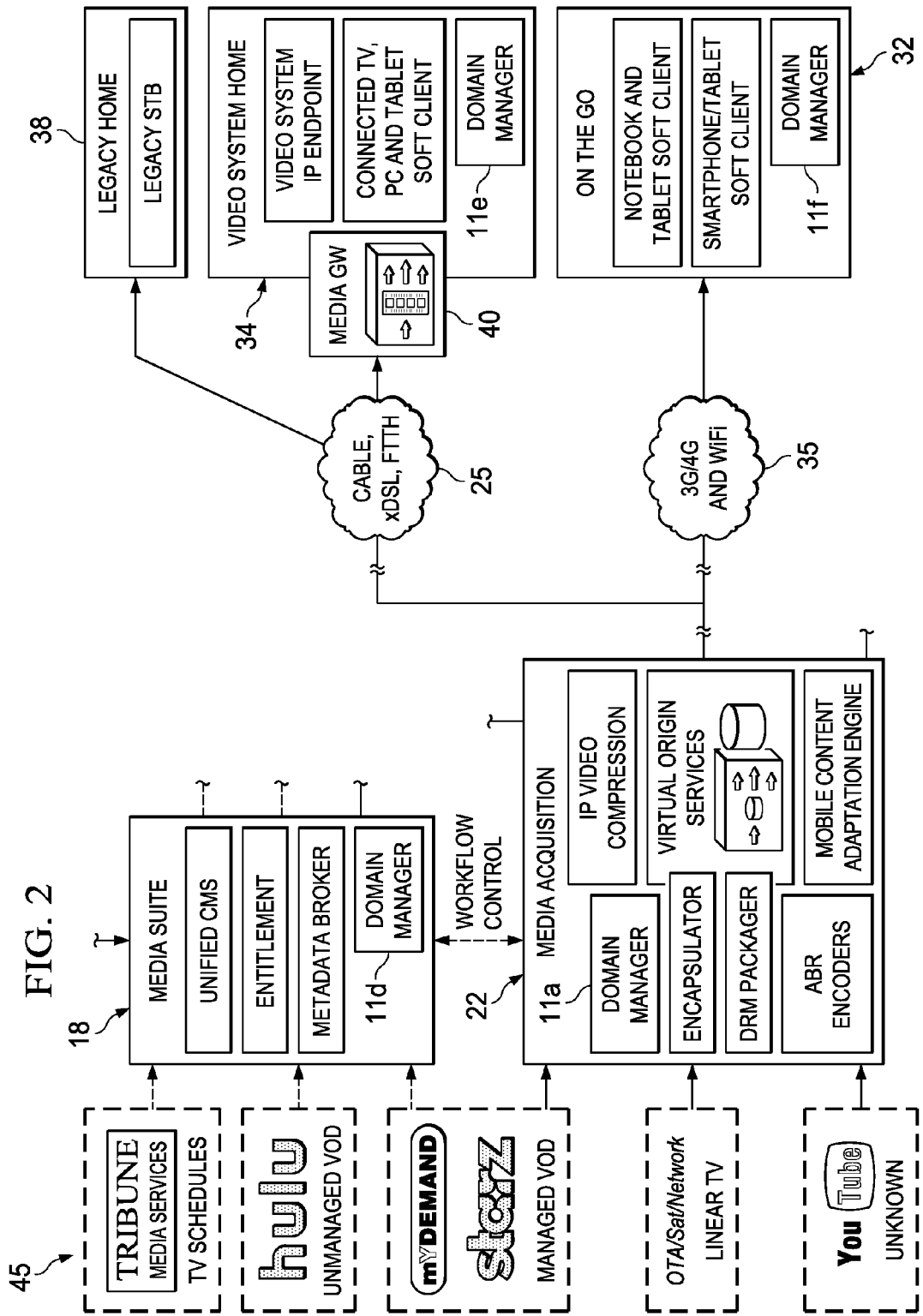
FIG. 2 is a simplified block diagram illustrating possible example details associated with one embodiment of the video system.

Turning to FIG. 2, FIG. 2 illustrates a number of example content sources 45 (e.g., YouTube, Starz, HULU, etc.). Devices and services can be divided into client-facing and cloud-facing components. Client-facing components and services can involve interaction with a client. Cloud-facing components and services can include everything else. In either case, services provide well-defined XMPP and/or HTTP-based interfaces. XMPP-based services can rely on the conductor infrastructure and the features it provides (e.g., service virtualization or persistent connections), whereas HTTP-based services in the video system can follow a standard web-services model.

Clients may interface directly with a service or they may interact with a front-end application/service, which in turns orchestrates and invokes other services (e.g., by use of the flexible workflow engine provided by service orchestration). Similarly, services may also rely on backend application logic to implement higher-level applications/services, which again may rely on service orchestration of other services. On the client itself, there may be one or more applications installed, and applications may contain add-on modules. In either case, the client-side application interacts with the video system cloud via one or more service invocations (e.g., "Create Recording" to schedule an nDVR recording, which is supported by a service or application front-end via HTTP or XMPP).

In operation, the media suite (unified CMS, entitlement, metadata broker, LSMS/EPG manager, etc.), the distribution suite (which is the content distribution that includes the service router, service engine/edge cache, etc.), the advertising suite, and the application suite can expose services that clients consume. The client-facing interfaces can be HTTP-based, and for the video system, they can continue to be HTTP-based, or they as well as other applications and services may be HTTP and/or XMPP based. In either case, efficient mechanisms can be used for clients to initially discover these services, select the instance of the component that can best fulfill service requests from that client, and manage the allocation of finite resources across all instances of that service. The video system can offer a unified service discovery capability through the conductor's service directory for both XMPP and HTTP-based services. For XMPP-based conductor services, service virtualization can be provided natively by the conductor infrastructure.

Figure 3:
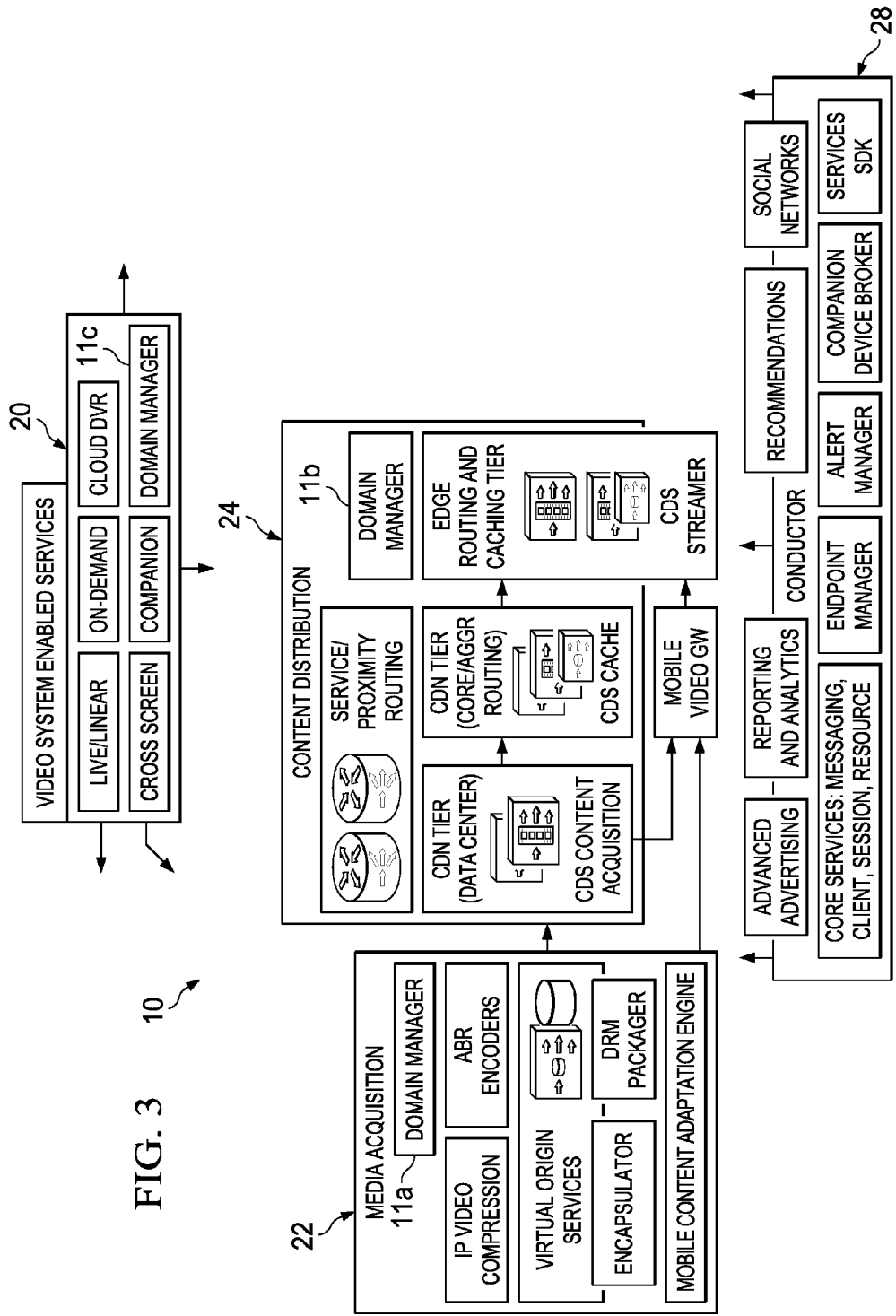
FIG. 3 is a simplified block diagram illustrating possible example details associated with one embodiment of the video system.

FIG. 3 is a simplified block diagram highlighting the video system enabled services, along with the conductor capabilities. The acquisition suite services, while not directly consumed by client endpoints, provide critical media processing services to the media suite and the distribution suite and, therefore, are also considered. Service routing and service virtualization for the media suite, the acquisition suite, and the distribution suite can continue to leverage existing implementations. Specifically, the media suite currently provides a global server loadbalancing (GSLB)/Apache web services mechanism for service virtualization and loadbalancing. The acquisition suite can provide loadbalancing for video on demand (VOD) transcoding through its transcode manager server; expanded mechanisms for service virtualization and loadbalancing for linear and VOD transcoding and encapsulation can also be provided in the video system. The distribution suite provides a service router based mechanism for virtualization and edge cache selection. The ad suite message exchanges are stateless with transaction data being maintained and replicated across the virtualized service cluster allowing any virtual endpoint to process a message exchange. For services accessed using traditional HTTP message exchanges, an appliance, or other hardware loadbalancer may be used. Alternatively, a loadbalancer or a software loadbalancer may be adopted in alignment with the overall video system architecture. When the ad suite is accessed using XMPP, the integrated video system conductor service virtualization is leveraged for loadbalancing and high availability.

Video system users can subscribe to the video services through their service provider. One or more users and devices may be associated with an account for service, and associated with each is a profile to enable personalization of the video services. Devices range from IP set-top boxes to soft clients on a variety of devices such as PCs, Macs, tablets, smartphones, etc., and all of those devices may be used either on the service provider's access network (home), or another network (e.g., on the go). Users may also have a video system home gateway, which could be a residential NAT/firewall type device with additional video features, such as media caching, and multicast-to-unicast conversion to optimize the end-user video experience and to reduce use of access network resources (especially when users have multiple devices accessing the same content). Cable and Telco (xDSL, Fiber, etc.) access networks are supported as managed networks, where quality of service and policy control enable a better end-user video experience than for unmanaged access network, that provide an over-the-top experience instead.

Users and devices can connect to the video system infrastructure using primarily persistent XMPP connections and stateless HTTP-based web services. The conductor provides the XMPP infrastructure to which clients (users/devices) connect via the connection manager and have their identity authenticated, thereby enabling a secure and personalized service experience. The conductor provides a basic set of connection management, messaging and core services, and additional services enablement features to allow for new services to be introduced. Services and applications can connect to the conductor, thereby enabling them to use the core services provided by the conductor, as well as exchange messages with each other through the XMPP messaging infrastructure.

Core services provided by the conductor include the client directory, which contains user and device profile information, and the publish-subscribe subsystem (PubSub), which enables listeners to subscribe to and be notified about events generated by publishers for a given topic. The session state manager tracks state associated with sessions (e.g., a video session when watching a movie), and the resource broker allows resources (e.g., network bandwidth), to be associated with that session. The application suite provides a set of supporting front-end and backend application logic to deliver the linear and time-shift TV, nDVR, on-demand, soft client download for certain platforms, value-added applications, and a web portal e-commerce platform for the on-demand storefront.

Figure 4:
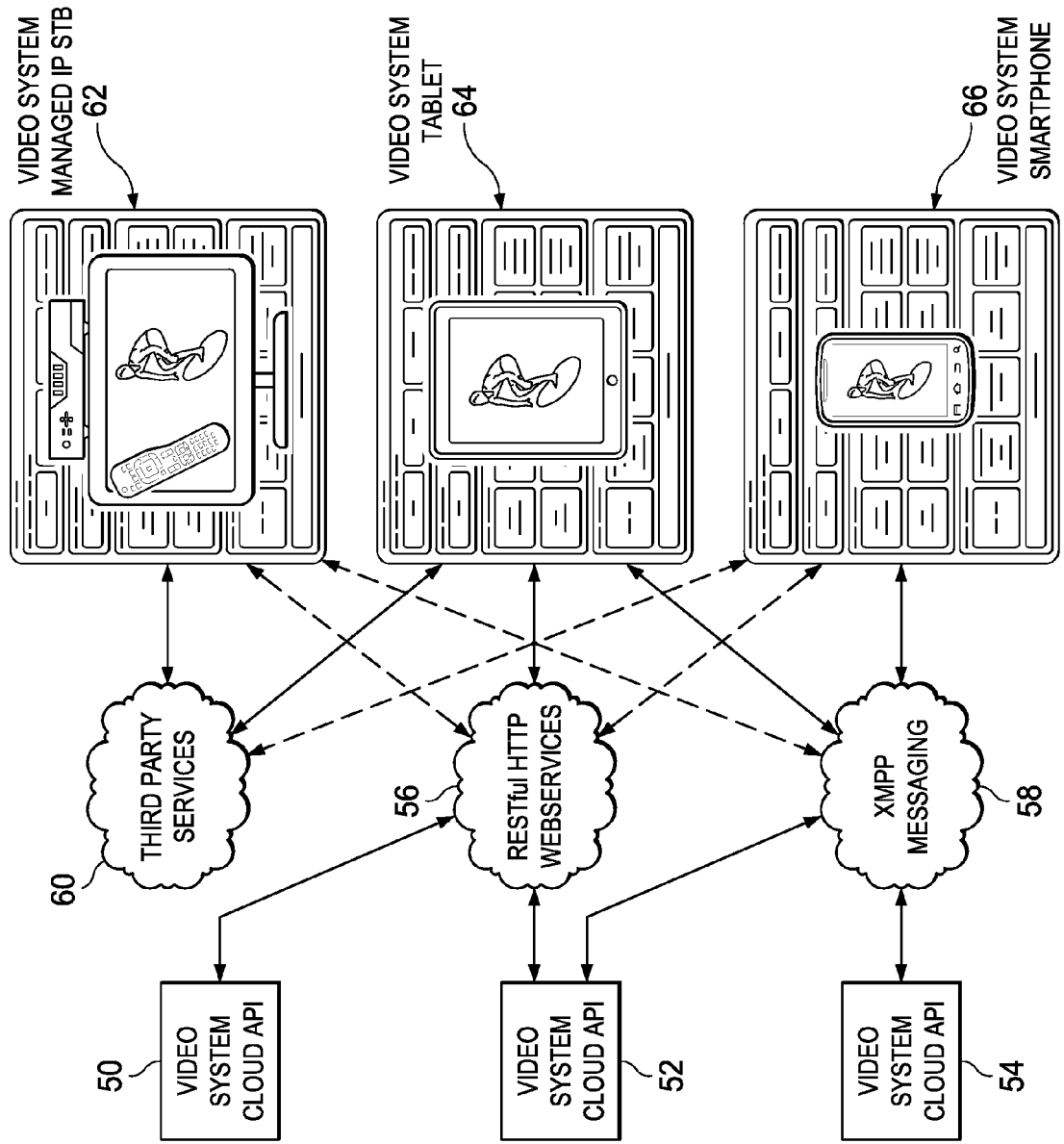
FIG. 4 is a simplified block diagram illustrating possible example details associated with one embodiment of the video system.

FIG. 4 is a simplified block diagram illustrating the video systems cloud APIs and clients. In this particular example, a video system cloud API 50 is provided as being connected to a RESTful HTTP web services network 56. In addition, other instances of a video system cloud API 52, 54 are coupled to an XMPP messaging cloud 58. An instance of third-party services 60 is also being illustrated and is coupled to a video system managed IP set-top box 62. Additionally, a video system iOS tablet 64 and a video system Android smartphone 66 are suitably connected to a given network. The cloud APIs can enable a consistent user experience. Additionally, the cloud APIs can leverage the best of XMPP and HTTP. The client SDKs can facilitate cloud API use across diverse platforms. Additionally, the cloud APIs can access third-party services.

Figure 5:
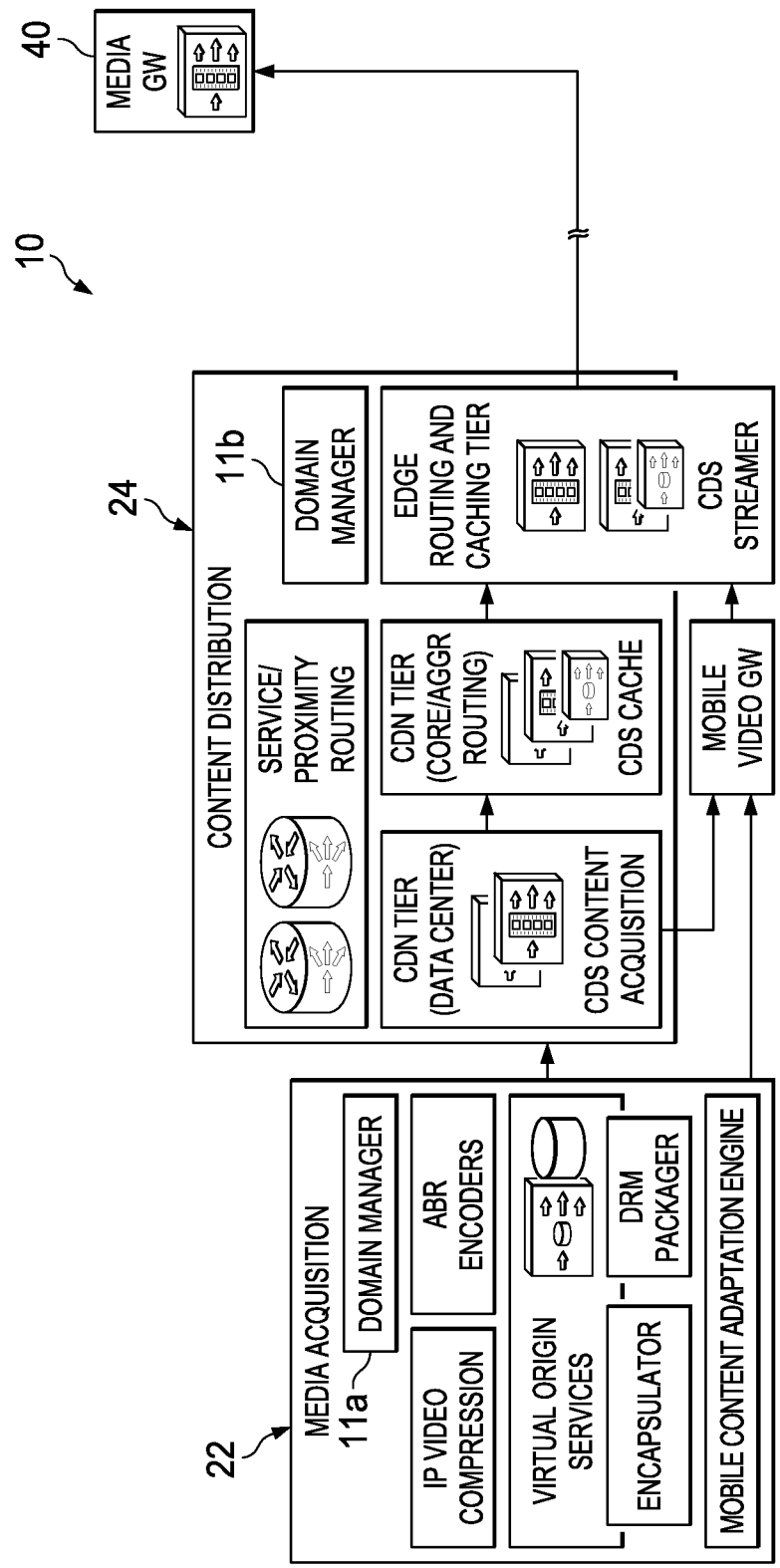
FIG. 5 is a simplified block diagram illustrating possible example details associated with one embodiment of the video system.

FIG. 5 is a simplified block diagram illustrating the content distribution suite and the media acquisition suite. In certain example implementations, the program guide retrieval and media delivery is HTTP-based. Video delivery supports adaptive bitrate, and it can utilize the distribution suite for efficient, service provider-scale video delivery. The distribution suite provides for distributed content caching throughout the network. HTTP requests for content can be sent to the service router (SR) first, which uses the proximity engine (PxE) to perform a proximity-based redirection of the HTTP request to a service engine (SE) for efficient media delivery. When the service engine receives the request, it either serves it from its cache, another service engine (higher in the caching hierarchy), or it contacts the content acquisition function, which retrieves the content from an origin server (in the acquisition suite). The distribution suite can be used for efficient delivery of any cacheable application object such as generic program guides, whereas personalized program guides may be retrieved directly from the media suite instead. In either case, clients may learn about new program guides being available by use of the PubSub XMPP service for program guide updates.

Figure 6:
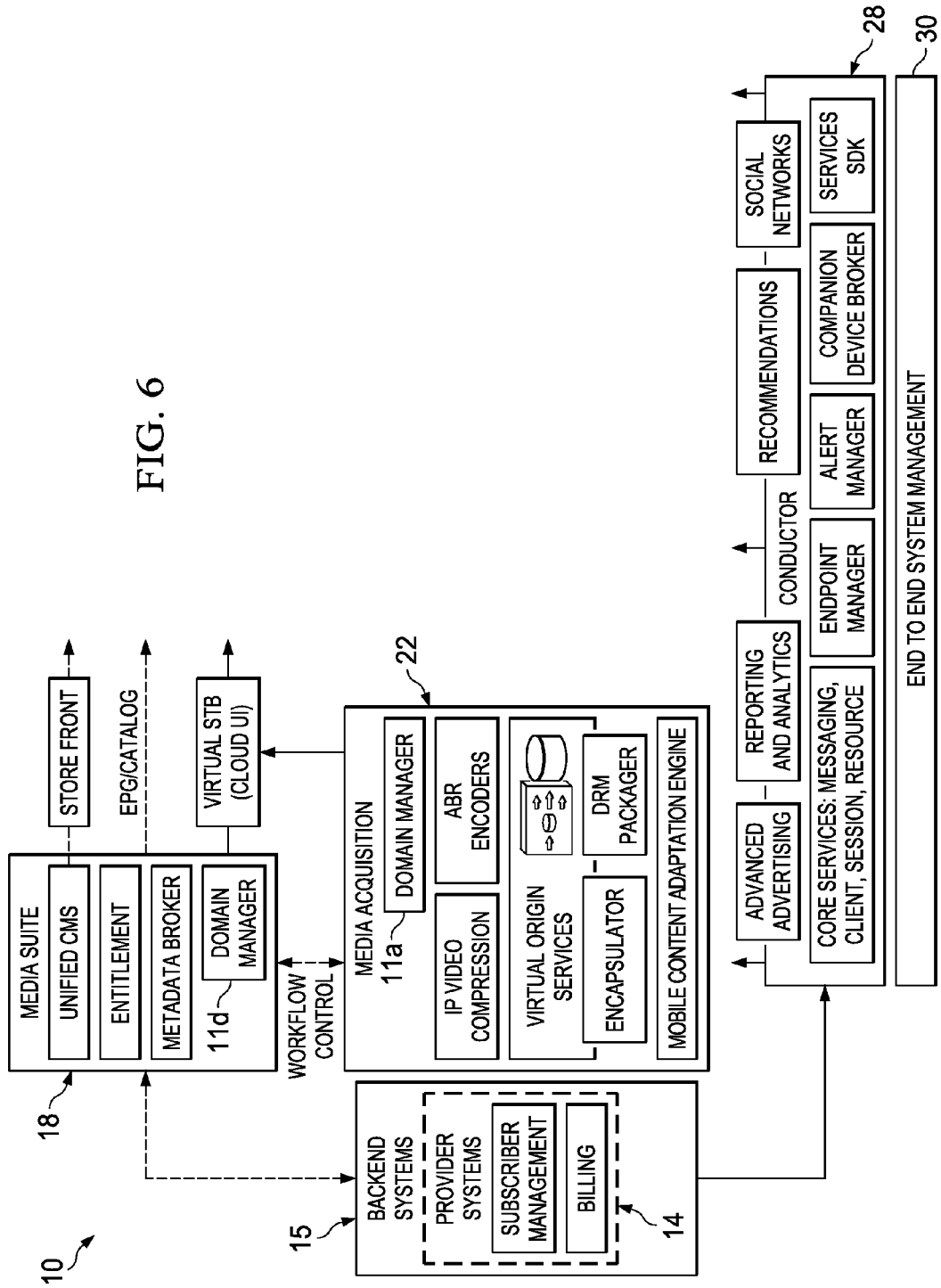
FIG. 6 is a simplified block diagram illustrating possible example details associated with one embodiment of the video system.

FIG. 6 is a simplified block diagram illustrating additional details associated with the media suite, provider systems, etc. The media suite component receives content metadata and electronic program guide (EPG) information from a multitude of content providers that are serving up managed and unmanaged content. The media suite normalizes this information and produces program guides for the associated content. This can involve using the Linear Services Management System/Electronic Program Guide (LSMS/EPG) manager for mapping content to channels, respecting blackout indications for content in certain regions, determining Digital Rights Management (DRM) to be applied, etc. The program guides typically vary by region based on locally available content, and program guides may vary on a per-user basis as well (personalized program guides). Similar functionality is provided for on-demand content, which can be made available and visible to end-users. Once the associated content is available, the media suite can then publish the program guide and catalog information for that content. The media suite additionally supports a variety of time-shift TV experiences, bridging the linear and on-demand domains; the DVR CMS (Content Management System) function can provide content management functions in this regard. The media suite provides a unified entitlement capability, enabling the service provider to provide support for multiple leading DRM ecosystems. Individual assets (on-demand, linear channels, applications), both managed and unmanaged, are combined into offers by the media suite publisher capability. For example, the service provider may choose to provide a unified VOD catalog that contains a mix of actively managed content as well as unmanaged content from aggregators such as Hulu.

Metadata associated with this content can be served by the metadata broker, which also serves metadata associated with program guides and nDVR recordings. Managed content can be acquired, transcoded, encrypted, and delivered by the service provider's infrastructure (acquisition suite), whereas the unmanaged content processing and delivery is the responsibility of the aggregator. Assets from both can be seamlessly merged into unified offers and presented to the user in a common catalog. In the case of managed content, the client can interact with the media suite entitlement management server. If the user is entitled to the content, the content resolution server (CRS) function decides on one or more suitable formats to serve up the content for the client in question; the formats may in turn depend on certain content policies controlled by the content policy function. In the case of unmanaged content, the client will interface directly to the aggregator's backend entitlement/delivery systems at the time of asset playback.

Before a user is permitted to watch certain content, whether it is linear or on-demand, the content can be made available. Unmanaged content is neither cached nor processed by the video system network, but is instead delivered over-the-top (OTT) as any other IP traffic. However, managed content can be acquired from the content provider, and possibly transformed in a multitude of ways. The acquisition suite serves this role by (re)encoding the content in possibly several different formats (codecs, resolutions, etc.) to support a multitude of end-user devices and the adaptive bitrate delivery of said content. VOD transcoding is done by a transcode manager, linear transcoding can be done by the digital content manager (DCM) and media processor, and ABR formatting can be handled by the media encapsulator. Encryption for DRM can also be provided. The acquisition suite and media suite coordinate with each other to determine what content to acquire, when the content is available and, hence, can be published in a catalogue, and which DRM to apply. Once the content has been transformed as appropriate, it can be stored on the origin server function, and the content is then available for distribution to endpoints. The content can then either be pushed out to the distribution suite (pre-fetching), or the distribution suite will retrieve and cache it when needed.

In spite of the use of HTTP ABR, some content may be served by multicast; the home gateway can translate between multicast delivery and unicast HTTP ABR to optimize access network and CDN (distribution suite) use. The multicast manager advertises statically and potentially dynamically provisioned multicast sessions defining the multicast cloud that determines the multicast senders, as well as the coverage for that multicast tree. The virtual origin service (VOS) embeds capabilities such as encapsulation, time-shifted representations, recording for nDVR, and multicast origination for multicast-cache fill; the service router function enables efficient service routing request handling across multiple VOS instances (e.g., to use a topologically close-by VOS).

Based on the program guide information, VOD catalog, etc., the client can have an HTTP URL for the content it wishes to acquire (e.g., a TV channel, a movie on-demand, etc.). When the client issues a request for said content, it will need to go through an entitlement check to determine if it's allowed to obtain the content requested. The entitlement check is performed by the media suite, which interfaces to the DRM/license servers to obtain DRM ecosystem-specific license keys that enable decryption of the DRM protected content.

The ad suite placement broker accepts advertising placement queries (e.g., in the form of an Society of Cable Telecommunications Engineers (SCTE) 130 Part 3 PlacementRequest message), from any initiating source (be it a client or the cloud). The placement broker gathers additional targeting criteria relative to both the content and the viewer from a combination of internal and external sources. For content specific metadata, the media suite's metadata broker and/or a 3rd party metadata source are queried using the SCTE 130 Content Information Service (CIS) interface. User or content viewer information is obtained from a combination of internal and/or 3rd party sources using the SCTE 130 Subscriber Information Service (SIS) interface. Example SIS metadata sources include video system's geolocation service, conductor's client directory service, indirect access to the service providers subscriber data, or an external 3rd party such as Experian.

One or more placement opportunities (a more generalized form of a traditional linear element that includes metadata describing decision ownership, policy, ad unit structure) can be obtained from a component implementing the SCTE 130 Placement Opportunity Information Service (POIS) interface. Based on ownership and provisioned placement service criteria, the placement broker applies the appropriate metadata visibility policies and routes the individual placement opportunities to the correct advertising decision service. The advertising decision service may be a component of a 3rd party campaign manager or it may be the ad suite's web ADS router. The web ADS router forwards decision requests to a 3rd party web ad decision server such as DoubleClick or Freewheel using their native request format and receives an Interactive Advertising Bureau (IAB) Video Ad Serving Template (VAST) 2.0 response. The placement broker aggregates the sum of advertising placement decisions and returns the result to the initiating source using a SCTE 130 Placement-Response message. The initiating source then intermixes the entertainment content and the selected advertising assets using the appropriate delivery platform specific assembly mechanism (for example, manifest manipulation for HLS, or player control for client HSS/Smooth, etc.).

The placement reporter acquires media session events including placement, playout, session, viewer, and remote control events, filters these events according to the provisioned placement service policies, and forwards the appropriate confirmation reports to the individual advertising decision services. The web ADS router provides an additional forwarding capability proxying to the VPAID format. The placement reporter also archives the data for later analysis and provides report generation support.

The management suite fulfills the management aspects (FCAPS) of the video system. The device manager performs basic hardware and firmware device management for video system managed devices (i.e., set-top boxes and home gateways, whereas the endpoint manager supports overall management for all video system clients in the form of application download, provisioning, event collection and reporting, etc.). Domain managers are subsystem managers for each product suite. A domain manager is either located in the management suite itself or it is a product in another suite that fulfills a dual role. Finally, the video system manager of managers (MoM) can offer an overall manager for the various management components of the platform.

The video system architecture defines several third-party elements that are not associated with any particular suite. Within the video system box, the Authentication/Authorization/Single-Sign-On (AA/SSO) function provides a common backend AA and SSO solution that allows for common credentials and single sign-on between different suites and interfaces. The accounting function enables storage of accounting data (e.g., for quality statistics), and the DOCSIS and Telco Policy functions provide policy server functions for Cable and Telco access networks. Outside the video system box, a number of third-party elements for 3rd Party web services, service provider BSS/OSS, Content Provider (CP) Control Systems, as well as EPG schedule information, VOD and Linear Content Sources, Integrated Receiver Decoders (IRD), Emergency Alert System (EAS), and Public CDNs are defined as well.

Turning to the example infrastructure associated with present disclosure, the clients of FIG. 1 can be associated with devices, customers, or end-users wishing to receive data or content in video system 10 via some network. The term 'client' is inclusive of devices used to initiate a communication, such as a receiver, a computer, a set-top box, an IRD, a cell phone, a smartphone, a tablet, a remote control, a personal digital assistant (PDA), a Google droid, an iPhone, an iPad, or any other device, component, element, or object capable of initiating voice, audio, video, media, or data exchanges within video system 10. The clients may also be inclusive of a suitable interface to the human user, such as a display, a keyboard, a touchpad, a remote control, or other terminal equipment. The clients may also be any device that seeks to initiate a communication on behalf of another entity or element, such as a program, a database, or any other component, device, element, or object capable of initiating an exchange within video system 10. Data, as used herein in this document, refers to any type of numeric, voice, video, media, or script data, or any type of source or object code, or any other suitable information in any appropriate format that may be communicated from one point to another.

The networks of FIG. 1 can represent a series of points or nodes of interconnected communication paths for receiving and transmitting packets of information that propagate through video system 10. The networks can offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as any wireless configuration, any enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Any of the suites, backend systems, the conductor, end to end system management, etc. can be representative of network elements that can facilitate the video management activities discussed herein. As used herein in this Specification, the term 'network element' is meant to encompass any of the aforementioned elements, as well as routers, switches, cable boxes, iPads, end-user devices generally, endpoints, gateways, bridges, STBs, loadbalancers, firewalls, inline service nodes, proxies, servers, processors, modules, or any other suitable device, component, element, proprietary appliance, or object operable to exchange content in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, these network elements can include software to achieve (or to foster) the video management activities discussed herein. This could include the implementation of instances of domain manager 11a-f. Additionally, each of these elements can have an internal structure (e.g., a processor, a memory element, etc.) to facilitate some of the operations described herein. In other embodiments, these video management activities may be executed externally to these elements, or included in some other network element to achieve the intended functionality. Alternatively, these network elements may include software (or reciprocating software) that can coordinate with other network elements in order to achieve the video management activities described herein. In still other embodiments, one or several devices may include any suitable algorithms, hardware, software, components, modules, interfaces, or objects that facilitate the operations thereof.

Figure 7:
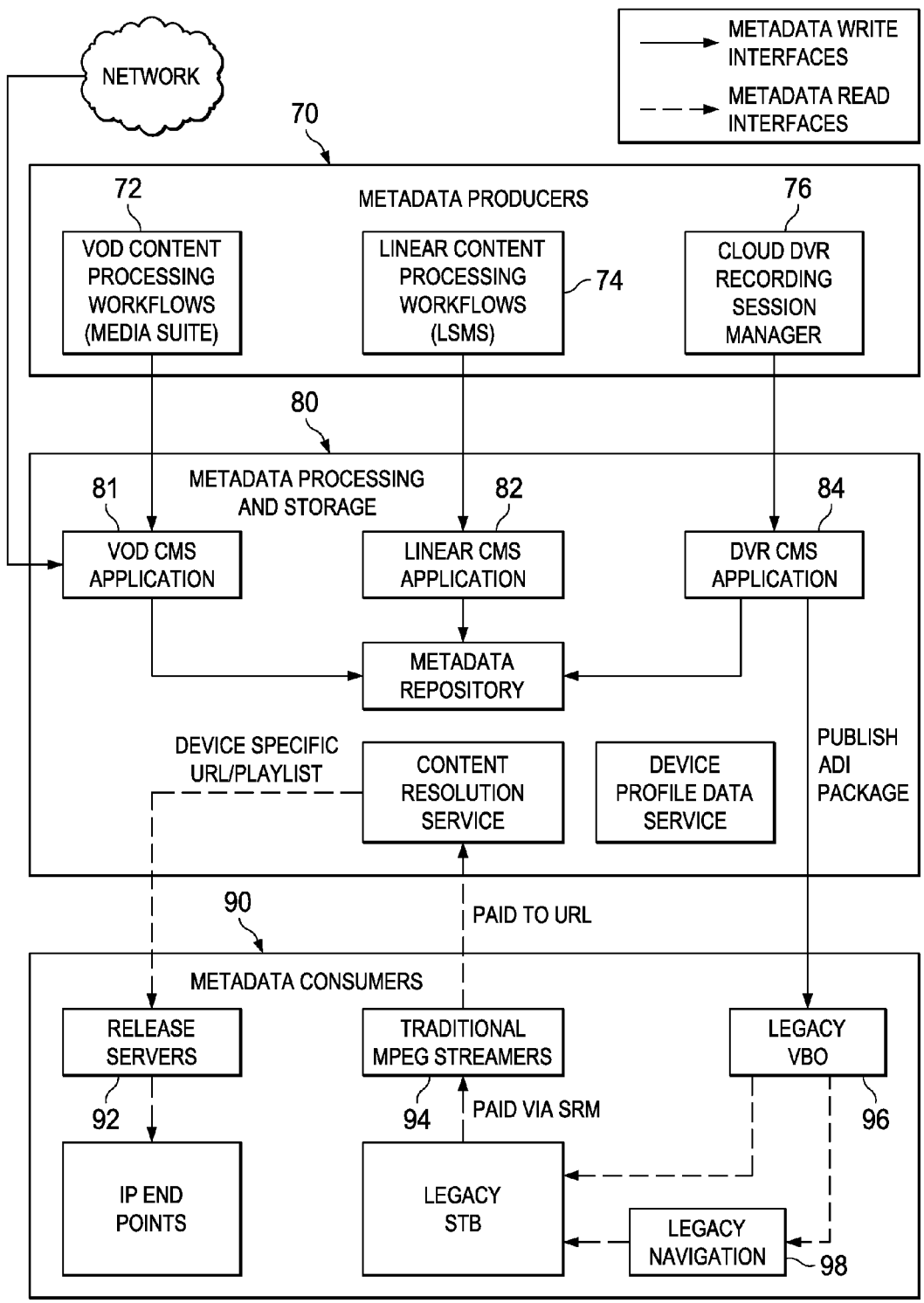
FIG. 7 is a simplified block diagram illustrating possible example details associated with one embodiment of a metadata broker architecture.

Turning to FIG. 7, FIG. 7 illustrates a metadata broker architecture associated with the present disclosure. This particular configuration includes a VOD content processing workflows (media suite) 72, an instance of linear content processing workflows (LSMS) 74, a cloud DVR recording session manager 76, a VOD CMS application 81, a linear CMS application 82, a DVR CMS application 84, a plurality of release servers 92, a plurality of MPEG streamers 94, a legacy Video Back Office (VBO) 96, and an instance of a legacy navigation 98. In general, metadata producers are generally indicated at 70, metadata processing and storage is generally indicated at 80, and metadata consumers are generally indicated at 90.

The architecture of FIG. 7 provides a metadata broker for unified metadata management, which covers any content (including personalized) to any device in any location. Content metadata can be separated from content delivery and formatted by use of a "release URL" that in turn supports policy-based content resolution to serve content over the most appropriate access network. This can involve using the most appropriate delivery technology (e.g., IP or QAM), and offering the content in a format/resolution that is suitable for the device and the network being implicated. The use of device and content-independent "release URLs" and the notion of a content resolution server enables content catalogs (e.g., EPGs, on-demand catalogs, etc.) that are both device and access network independent. The architecture still enables flexible policies to control the actual delivery format and network type used (e.g., QAM or IP).

In addition, the architecture allows for a determination of an appropriate content format and corresponding URL resolution in real-time. This can be based on the actual device requesting it and the type of network on which the content resides, where different types of policies influence the actual format(s) to provide certain quality levels (e.g., Gold, Silver Bronze levels). Additionally, device types, network types, content formats, and policies can be added, changed, or removed without affecting any catalogue or content metadata information. Also, content metadata, including metadata for personal content, can be managed and brokered uniformly to enable a unified service experience (e.g., search for any content on any device from any network).

In operation, the metadata broker can provide metadata to end-users as well as the system itself. As for other metadata systems, the metadata broker can support a search interface that can search on different types of content and metadata (e.g., genre, actor, etc.). The metadata broker also supports personalized metadata searching, whereby the search space for personal content is for a specific set of users (by default, the user himself). User groups may be formed, for example, to enable the sharing of family videos with family members as part of the search space.

The EPG can provide separation between channel/station definition and content delivery and, in particular implementations, support the delivery of a station over multiple different access network types (e.g., QAM-based, IP ABR, IP multicast, etc.). Similar considerations can be provided for other types of content (e.g., on-demand). The choice of the delivery mechanism, as well as the specific entity to deliver the content (e.g., a particular QAM modulator, CDN cache, etc.) can be provided under policy control by the provider using a "release URL" for each channel. The "release URL" is a generic URL that can be presented to a CRS at runtime to redirect the client to a stream (delivery type and source) that is most appropriate for the type of device, as well as the location of the device. Devices may present these parameters themselves and/or they may be accessible in a client/device directory, where this information is stored and retrieved by the CRS.

The CRS can be viewed as one step in the overall release URL resolution workflow, and it can access information on the device type, as well as device location (e.g., via a Geolocation server, internally provisioned data, etc.). It can use those parameters as inputs to a policy-based decision concerning the choice of delivery method and location. For example, a QAM-based set-top box can be redirected to a QAM modulator. By contrast, an iPad would normally be redirected to an IP-based delivery mechanism. Depending on the location, it may be using CDN A or CDN B, or it may even be multicast-based in certain networks. A local QAM-to-IP gateway could reside in a consumer's home as well, in which case the CRS may redirect the iPad to the gateway using IP (e.g., when the iPad is actually in the consumer's home).

Content resolution may also be used to provide different quality levels. For example, devices with strong DRM implementations may be allowed access to streams in HD format, whereas weak DRM implementations may not. Similarly, depending on the device location, device type (e.g., screen size), etc., different resolution options may be offered as well. Quality levels could also be based on subscription-information (e.g., Gold/Silver/Bronze levels). Similarly, when content is available in different encoding formats, the content resolution service can translate the release URL to a stream (or publish URL) in a format that matches the end-client's media player decoding and/or playback capabilities (as well as the service provider's content policies).

The release URL may be provided to client devices prior to the availability of the content itself. For example, EPG data delivered to a client device may contain a release URL for programs that have not yet aired but will be available, once aired, as part of a time shift or catch-up TV service. The CRS can determine (at request time) whether the given content is available and direct the requesting device to the content or to alternative messaging if it is not yet available.

The CRS can also provide various functions including the translation of device-specific namespaces to the source content URLs. Certain end-client devices (e.g., QAM endpoints) use identifiers that are not URLs to reference the content (e.g., Provider/Asset ID (PAID)); however, when the origin and recording systems store content they store it using URLs as a key. The content resolution service can retrieve the locator record based on the PAID provided and can translate the PAID to the source URLs. The streaming systems and the CDN acquisition systems can then use this to retrieve the contents from the origin service. The CRS can also provide for recording playlist generation. Recorder functions may use multiple segments to store a given program recorded by the end user. At playback time, the client can query the CRS for a given record locator that can then be resolved to a playlist of segments.

By providing a layer of abstraction between the release URL and the actual content that may be delivered to a given client device, the CRS allows for the introduction of new client devices with disparate retrieval methods and capabilities with minimum changes to existing systems. Content may be replaced or substituted without necessitating changes to existing client data or published locators. It should also be noted that the content resolution service can apply to all forms of video service, not just linear content.

Figure 8:
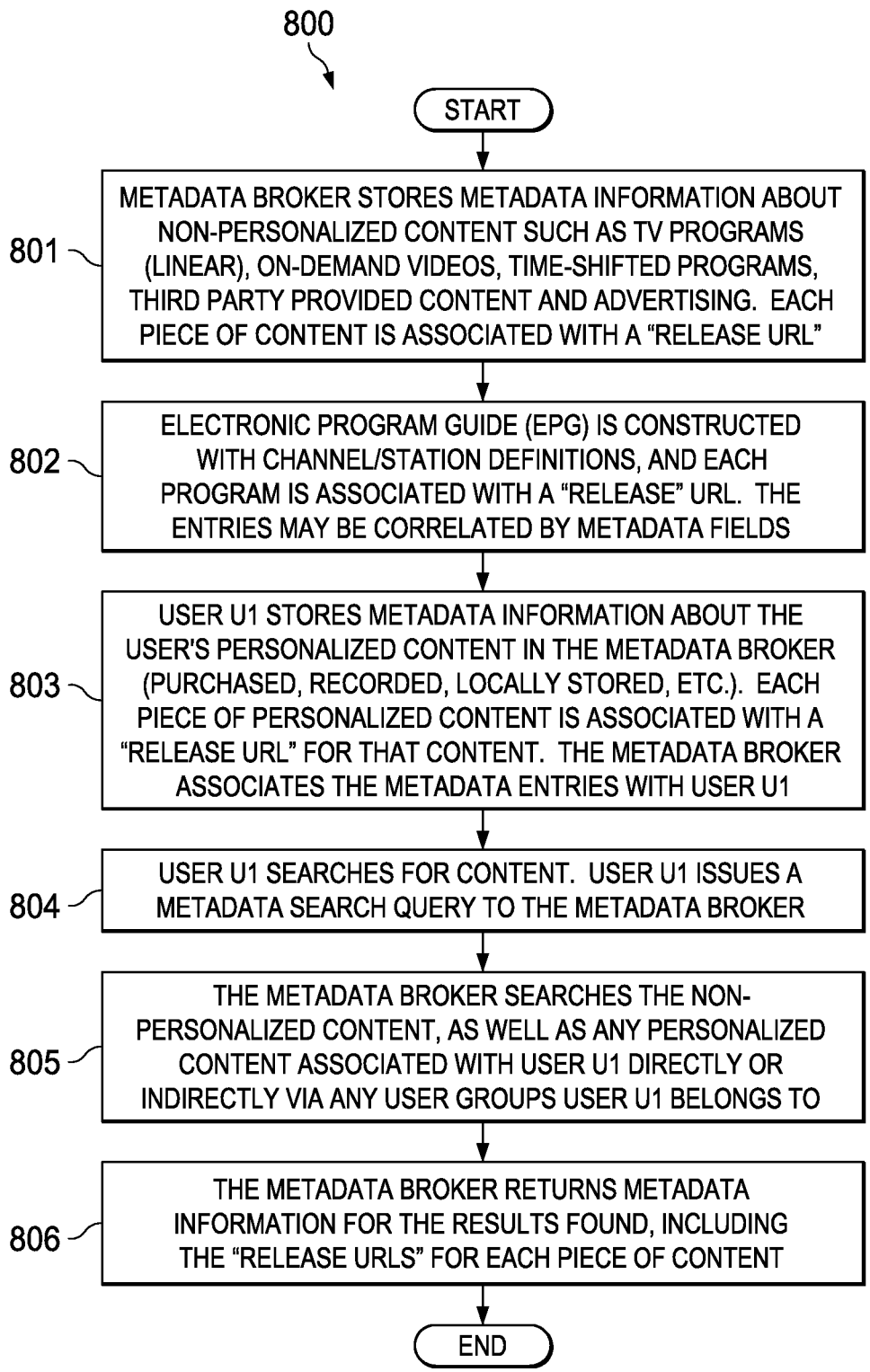
FIGS. 8-9 are simplified flowcharts illustrating potential operations associated with the video system in accordance with one embodiment of the present disclosure.

Turning to FIG. 8, FIG. 8 is a simplified flowchart 800 illustrating example operations associated with the metadata broker, EPG, and URL release activities of the present disclosure. The flow may begin at 801, where the metadata broker stores metadata information about non-personalized content such as TV programs (linear), on-demand videos, time-shifted programs, third party provided content and advertising. Each piece of content can be associated with a Release URL. At 802, the EPG is constructed with channel/station definitions, and each program is associated with a Release URL. The entries in 801 and 802 may be correlated by metadata fields. At 803, user U1 stores metadata information about the user's personalized content in the metadata broker (e.g., purchased, recorded, locally stored, etc.). Each piece of personalized content is associated with a Release URL for that content. The metadata broker associates the metadata entries with user U1. The user may also be associated with a user group Ga. Additional users may belong to the user group. At 804, user U1 searches for content. User U1 can issue a metadata search query to the metadata broker (e.g., searching based on genre, actor, locally-stored content, etc.). At 805, the metadata broker searches the non-personalized content, as well as any personalized content associated with user U1 directly or indirectly via any user groups to which user U1 belongs. At 806, the metadata broker returns metadata information for the results found, including the Release URLs for each piece of content.

Figure 9:
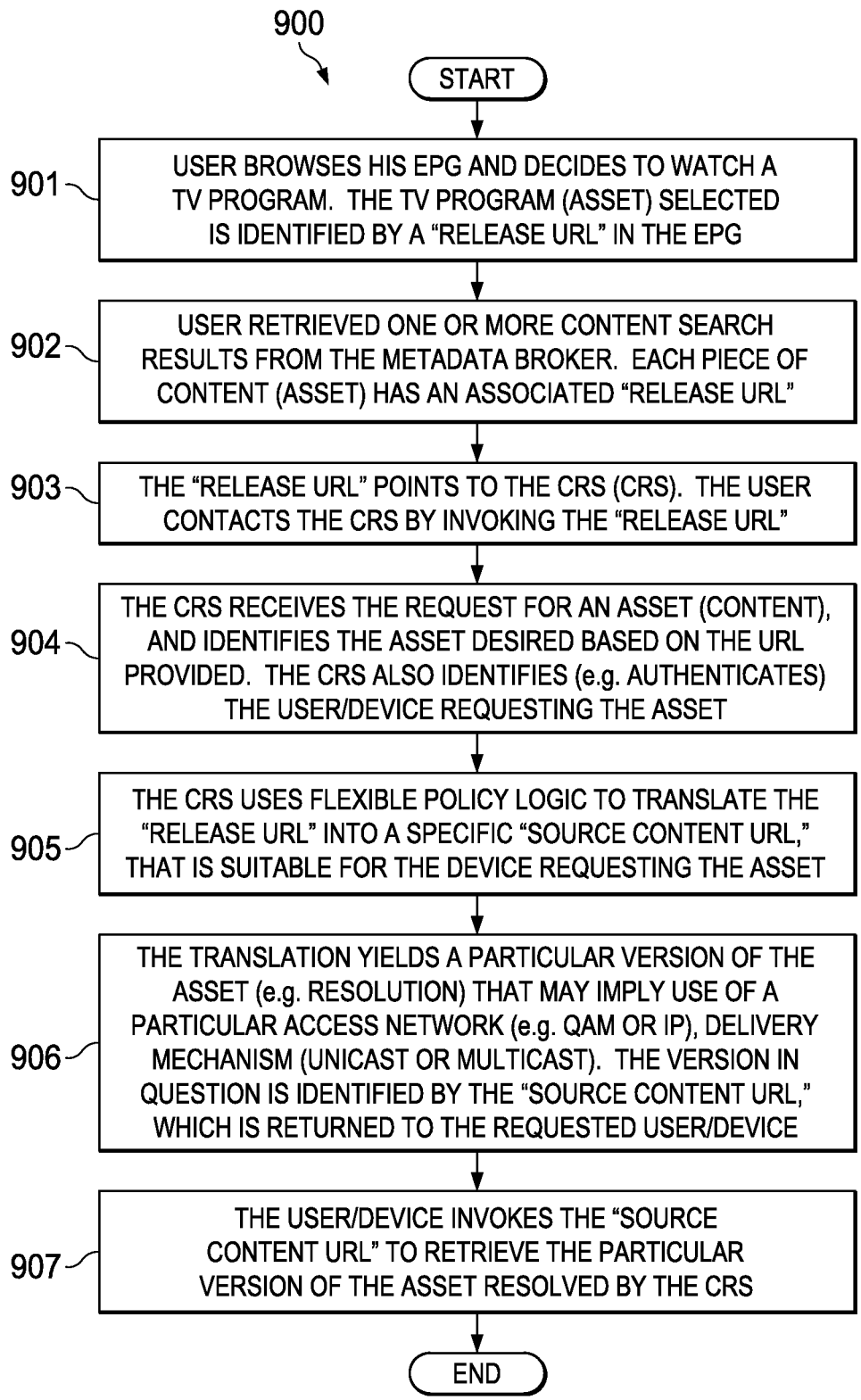

Turning to FIG. 9, FIG. 9 is a simplified flowchart 900 illustrating example activities associated with Release URLs and the CRS of the present disclosure. The flow may begin at 901, where a user browses his EPG and decides to watch a TV program. The TV program (asset) selected is identified by a Release URL in the EPG. At 902, the user retrieves one or more content search results from the metadata broker. Each piece of content (asset) has an associated Release URL. Optionally, other types of locators (e.g., not based on Release URL) could be used as well (e.g., a Provider/Asset ID).

At 903, the Release URL points to the CRS. The user contacts the CRS by invoking the Release URL. At 904, the CRS receives the request for an asset (content), and identifies the asset desired based on the URL provided. The CRS also identifies (e.g., authenticates) the user/device requesting the asset. At 905, the CRS uses flexible policy logic to translate the Release URL into a specific source content URL that is suitable for the device requesting the asset. The policy logic may, for example, be driven by the user/device subscription policy, the device type, the current device location, access networks available, DRM constraints, etc. The user/device may provide some/all of this information and/or the CRS may retrieve some/all of this information itself from additional infrastructure (e.g., client directory, subscriber management system, etc.).

At 906, the translation yields a particular version of the asset (e.g., resolution) that may imply use of a particular access network (e.g., QAM or IP), delivery mechanism (unicast or multicast), etc. The version in question is identified by the source content URL, which is returned to the requested user/device. The asset could also refer to a playlist or manifest file, which in turn facilitates delivery of different formats (ABR or progressive download), content insertion (e.g., advertising), etc. At 907, the user/device invokes the source content URL to retrieve the particular version of the asset resolved by the CRS. Note that this could include non-IP based delivery mechanisms (e.g., QAM). The source content URL will typically point to a CDN.

As identified previously, a network element can include software (e.g., domain manager 11a-f) to achieve the video management operations, as outlined herein in this document. In certain example implementations, the video management functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors provided in any of the suites, in conductor 28, in media gateway 34, anywhere in legacy home 38, video system home 34, in back-end systems 15, in end to end system management 30, etc.]). In some of these instances, a memory element [provided in any of the suites, in conductor 28, in media gateway 34, anywhere in legacy home 38, video system home 34, in back-end systems 15, in end to end system management 30, etc.] can store data used for the operations described herein. This includes the memory element being able to store instructions (e.g., software, code, etc.) that are executed to carry out the activities described in this Specification. The processors can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the video management operations as outlined herein. Additionally, each of these devices may include a processor that can execute software or an algorithm to perform the video management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that video system 10 (and its teachings) are readily scalable and, further, can accommodate a large number of components, as well as more complicated/sophisticated arrangements and configurations. Accordingly, the examples provided should not limit the scope or inhibit the broad teachings of video system 10, as potentially applied to a myriad of other architectures.

It is also important to note that the steps in the preceding FIGURES illustrate only some of the possible scenarios that may be executed by, or within, video system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by video system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    establishing a connection between a client and a messaging fabric associated with a video system that includes a metadata broker element;
    storing metadata information associated with content, wherein the content is associated with a release uniform resource locator (URL);
    generating a content guide that includes a plurality of assets, wherein each of the assets are associated with a corresponding release URL and at least one corresponding source content URL, wherein the corresponding release URL indicates a content resolution server for returning one of the at least one corresponding source content URLs to the client;
    identifying an asset requested by the client based on a corresponding release URL associated with the requested asset; and
    translating the corresponding release URL into a specific source content URL and returning the specific source content URL to the client, wherein the returned specific source content URL specifies a particular access network and a particular delivery entity for delivering a particular version of the asset.

2. The method of claim 1, wherein entries in the content guide are correlated with other content and metadata in the metadata broker via metadata fields.

3. The method of claim 1, wherein the content is associated with a selected one of a group of types of content, a group consisting of:
    a) linear television programs;
    b) on-demand videos;
    c) time-shifted programs; and
    d) advertising.

4. The method of claim 1, further comprising:
    storing particular metadata information associated with a user's personalized content in the metadata broker element, wherein the personalized content is associated with a particular release URL.

5. The method of claim 4, further comprising:
    associating the user's personalized content with a user and a user group to which the user belongs.

6. The method of claim 1, further comprising:
    receiving a metadata search query for content at the metadata broker element; and
    providing a particular release URL that matches the search query.

7. The method of claim 1, further comprising:
    authenticating the client requesting the asset; and
    providing the asset to the client.

8. The method of claim 1, wherein the particular access network and the particular delivery entity for retrieving the particular version of the asset are determined based on a location of a device associated with the client requesting the asset.

9. The method of claim 1, further comprising:
    receiving a request that includes personalized content;
    limiting a response to the request to particular metadata from an authenticated user and user groups to which the authenticated user belongs.

10. The method of claim 1, further comprising:
    associating a plurality of users with a user group that is identified using particular metadata.

11. Logic encoded in one or more non-transitory media that includes instructions for execution and when executed by a processor is operable to perform operations, comprising:
    establishing a connection between a client and a messaging fabric associated with a video system that includes a metadata broker element;
    storing metadata information associated with content, wherein the content is associated with a release uniform resource locator (URL);
    generating a content guide that includes a plurality of assets, wherein each of the assets are associated with a corresponding release URL and at least one corresponding source content URL, wherein the corresponding release URL indicates a content resolution server for returning one of the at least one corresponding source content URLs to the client;
    identifying an asset requested by the client based on a corresponding release URL associated with the requested asset; and
    translating the corresponding release URL into a specific source content URL and returning the specific source content URL to the client, wherein the returned specific source content URL specifies a particular access network and a particular delivery entity for delivering a particular version of the asset.

12. The logic of claim 11, wherein entries in the content guide are correlated with other content and metadata in the metadata broker via metadata fields.

13. The logic of claim 11, the operations further comprising:
    associating a plurality of users with a user group that is identified using particular metadata.

14. The logic of claim 11, the operations further comprising:
    receiving a metadata search query for content at the metadata broker element; and
    providing a particular release URL that matches the search query.

15. The logic of claim 11, the operations further comprising:
    authenticating the client requesting the asset; and
    providing the asset to the client.

16. The logic of claim 11, wherein the particular access network and the particular delivery entity for retrieving the particular version of the asset are determined based on a location of a device associated with the client requesting the asset.

17. An apparatus, comprising:
    a memory element configured to store instructions;
    a processor coupled to the memory element; and
    a metadata broker element, wherein the apparatus is configured to:
        establish a connection between a client and a messaging fabric associated with a video system that includes a metadata broker element;
        store metadata information associated with content, wherein the content is associated with a release uniform resource locator (URL);
        generate a content guide that includes a plurality of assets, wherein each of the assets are associated with a corresponding release URL and at least one corresponding source content URL, wherein the corresponding release URL indicates a content resolution server for returning one of the at least one corresponding source content URLs to the client;
        identify an asset requested by the client based on a corresponding release URL associated with the requested asset; and
        translate the corresponding release URL into a specific source content URL and return the specific source content URL to the client, wherein the returned specific source content URL specifies a particular access network and a particular delivery entity for delivering a particular version of the asset.

18. The apparatus of claim 17, wherein entries in the content guide are correlated with other content and metadata in the metadata broker via metadata fields.

19. The apparatus of claim 17, wherein the apparatus is further configured to:
    store particular metadata information associated with a user's personalized content in the metadata broker element, wherein the personalized content is associated with a particular release URL.

20. The apparatus of claim 17, wherein the apparatus is further configured to:
    receive a metadata search query for content at the metadata broker element; and
    provide a particular release URL that matches the search query.

* * * * *